Figure 1:
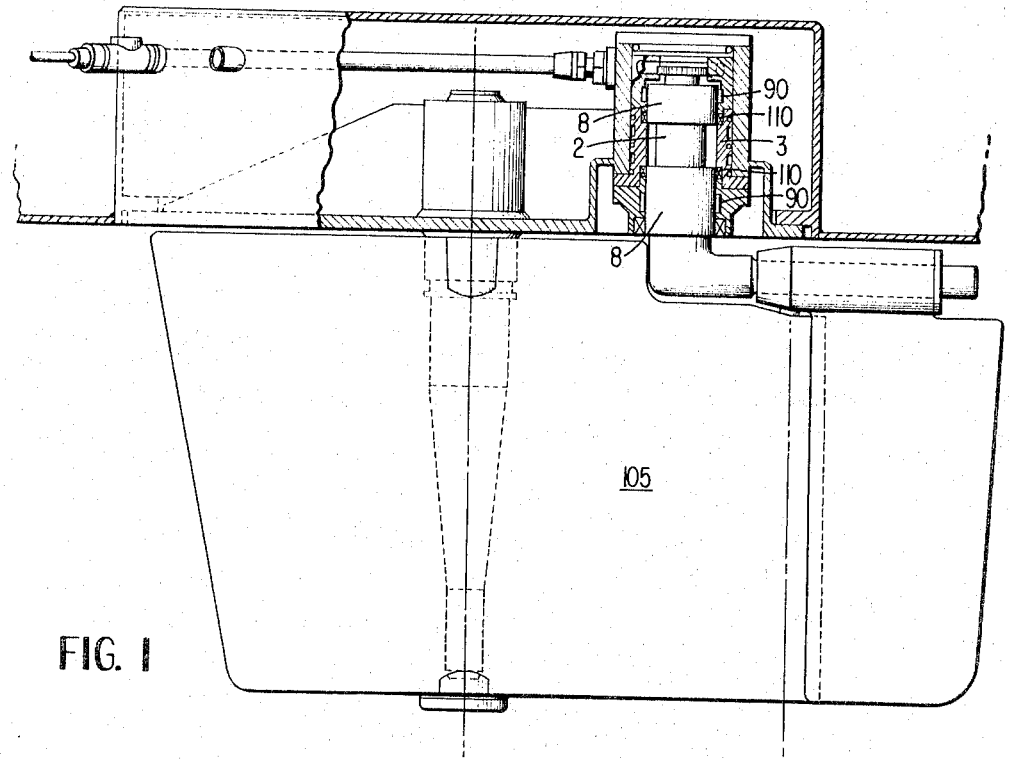

May 9, 1967  W. L. BLAKE  3,318,201
ROTARY HYDRAULIC ACTUATOR WITH IMPROVED SEALING MEANS
Filed Feb. 2, 1965  5 Sheets-Sheet 1

INVENTOR.
WILLIAM L. BLAKE
Browne, Schuyler, & Beveridge
BY
ATTORNEYS.

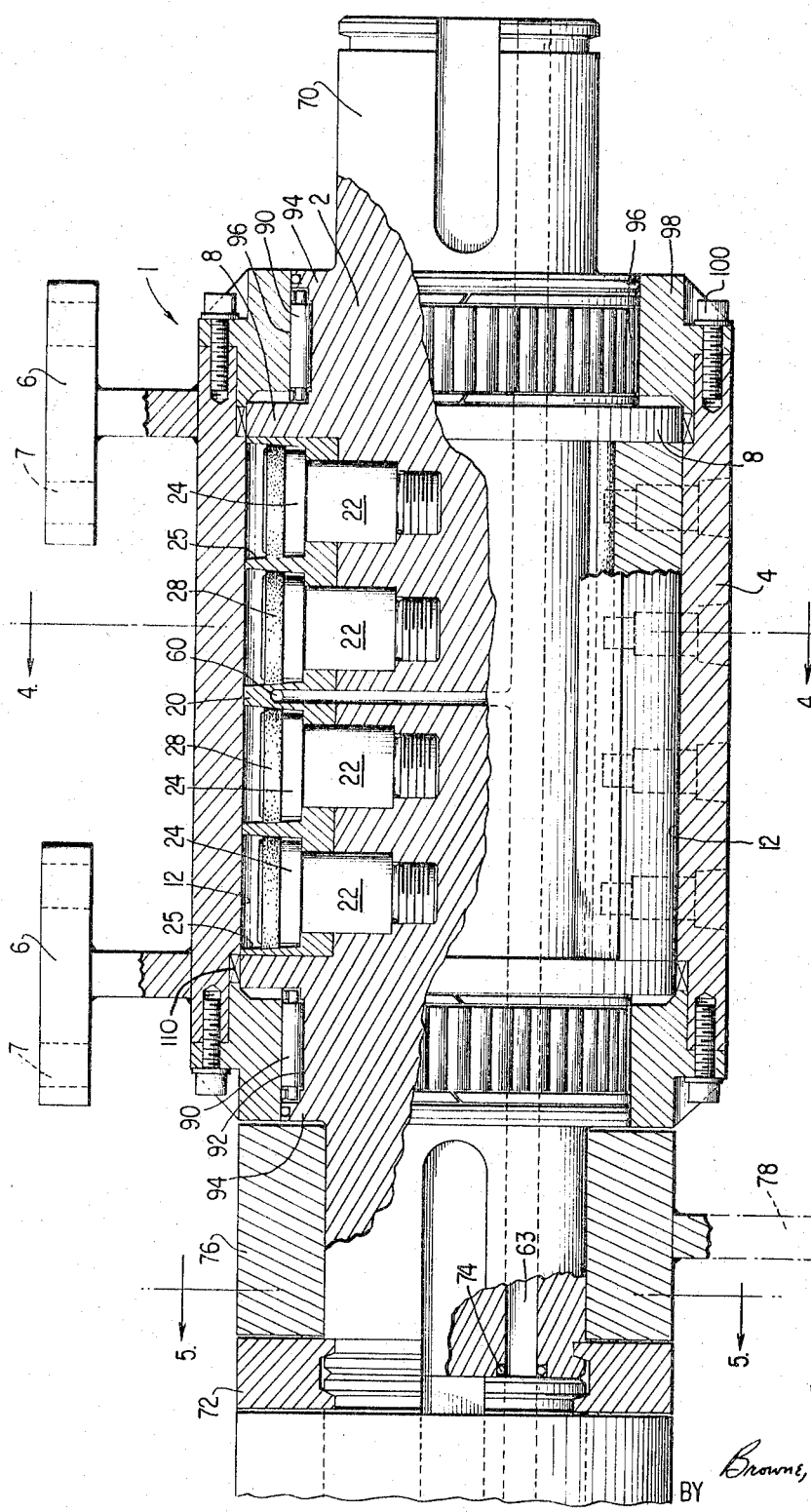

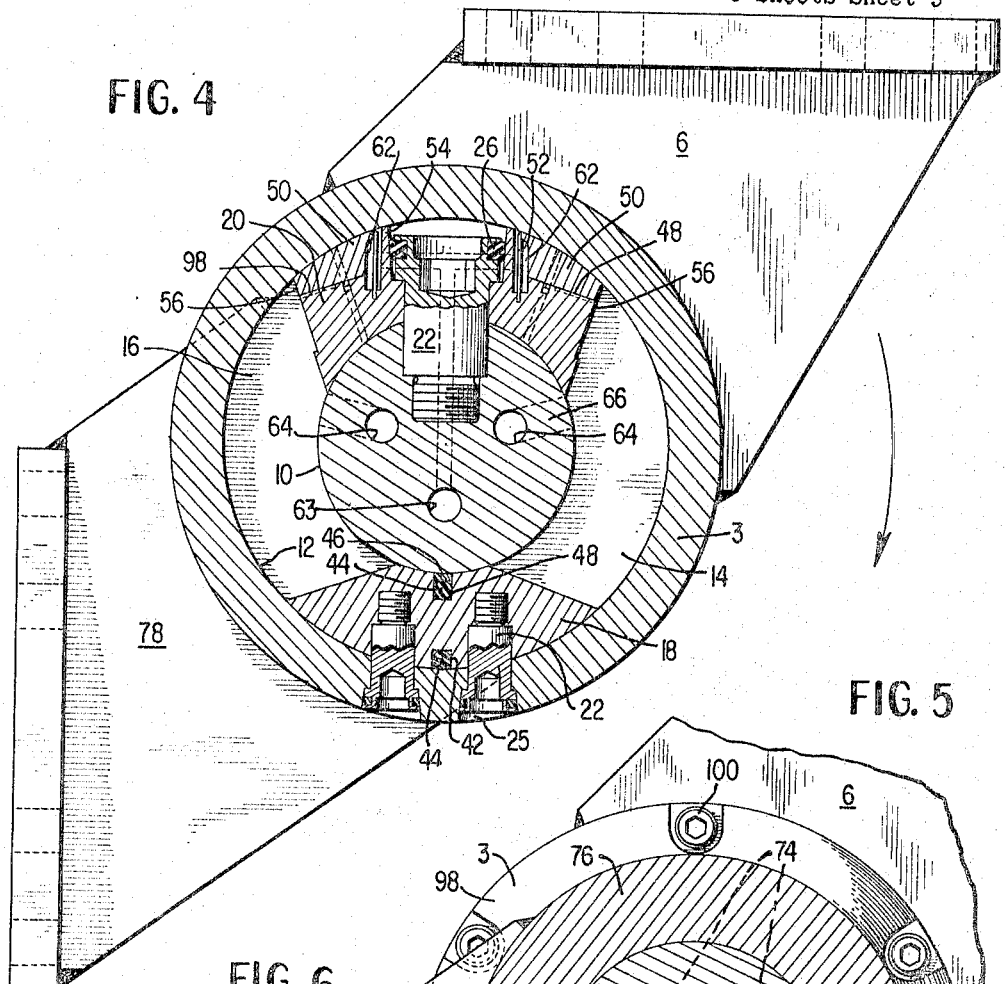

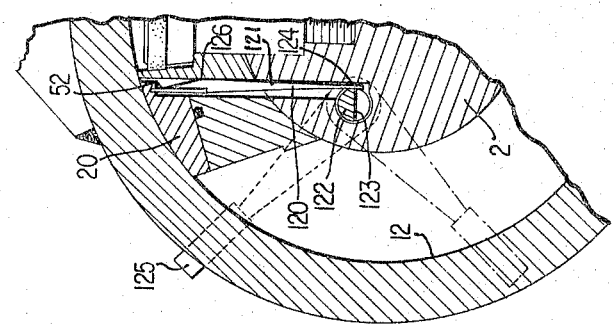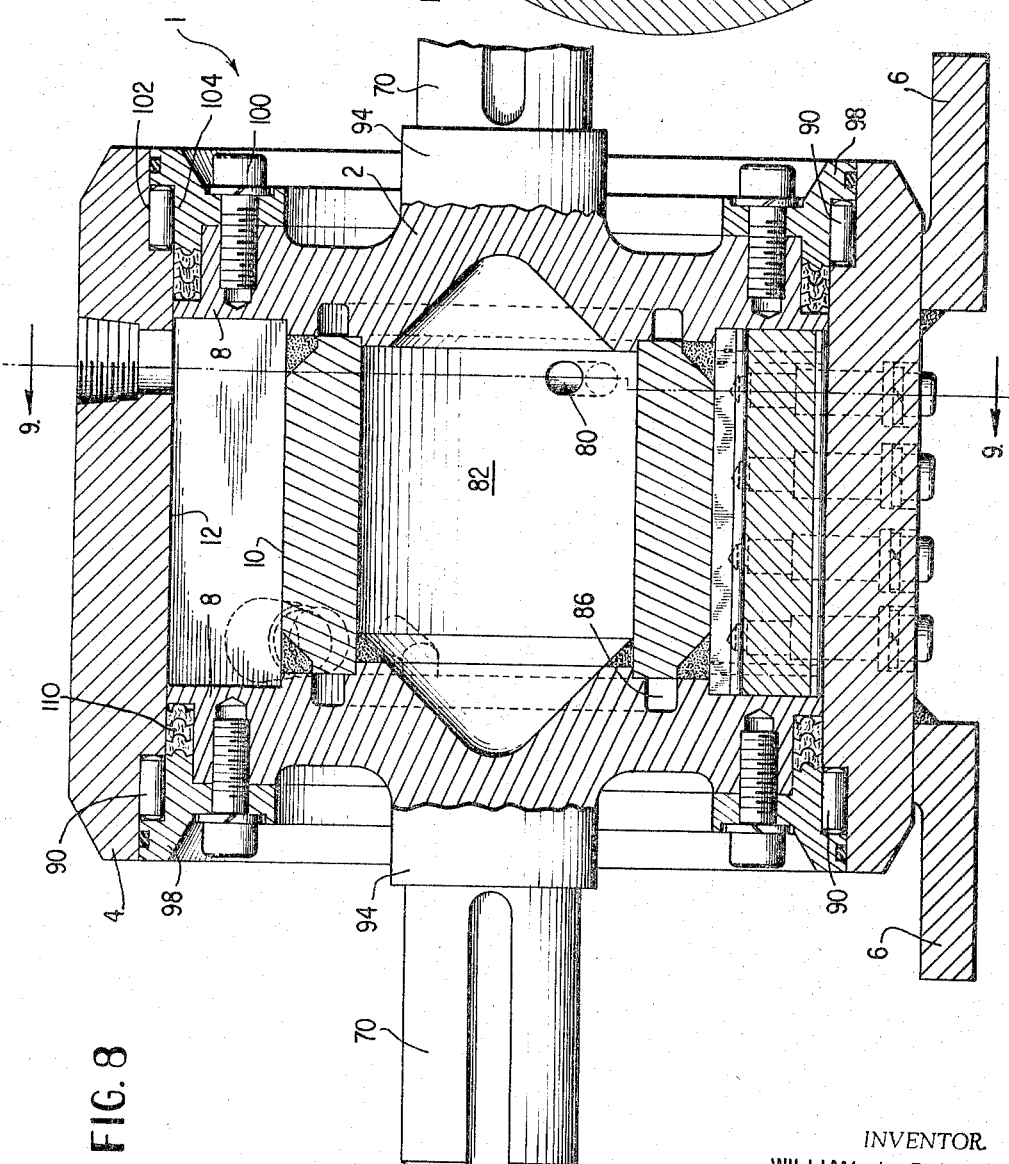

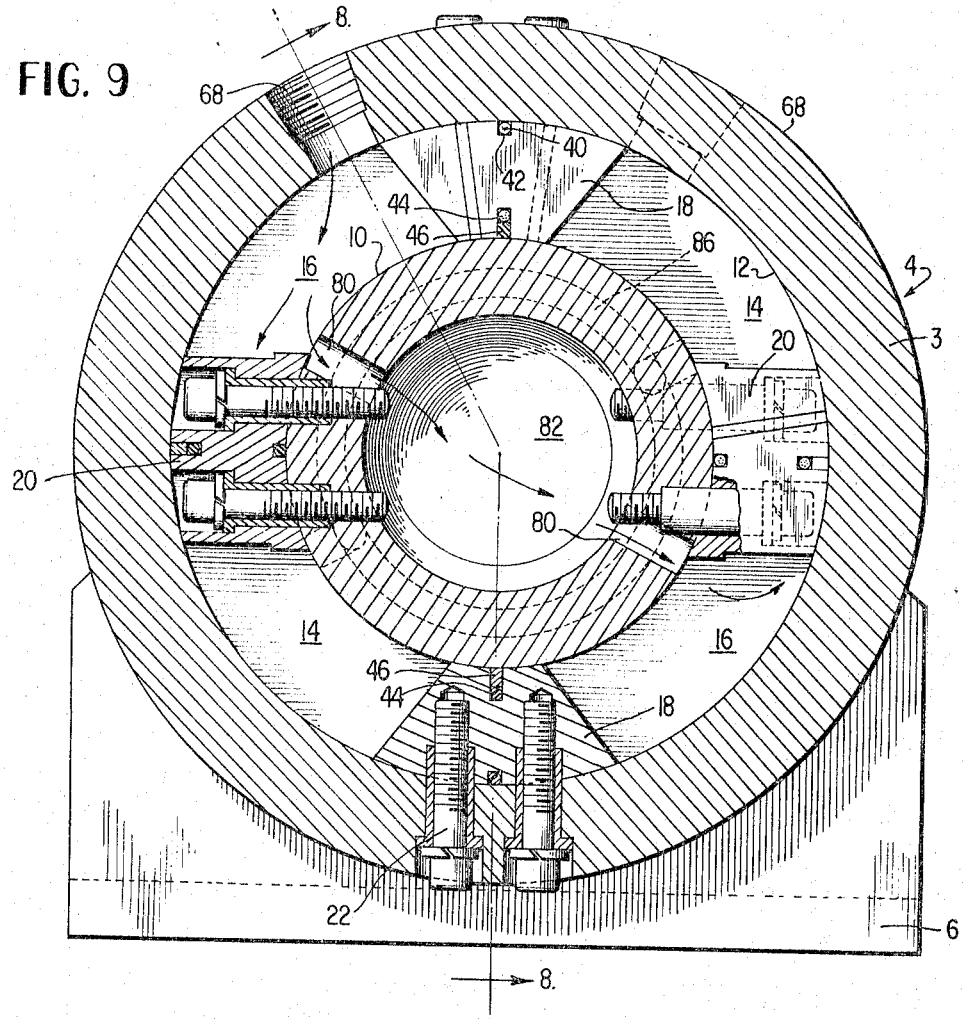

United States Patent Office 3,318,201
Patented May 9, 1967

3,318,201
ROTARY HYDRAULIC ACTUATOR WITH IMPROVED SEALING MEANS
William L. Blake, Franklin Lakes, N.J., assignor to William Blake and Company Incorporated, Franklin Lakes, N.J.
Filed Feb. 2, 1965, Ser. No. 429,773
1 Claim. (Cl. 92—121)

This invention relates generally to fluid motors, and more particularly to a rotary hydraulic actuator with improved sealing means.

While the utility of rotary hydraulic actuators in various applications has long been recognized, the extent of their actual use has been seriously limited by a number of problems, which, in the past, have been considered inherent in this type of device. Among these problems has been that of intervane leakage under high pressure which is generally the result of distortion of the elements under load, and of misalignment of the rotor and stator of the actuator caused either by loads resulting from the direct application of hydraulic pressure to the interior of the actuator or by external loads encountered during operation of the device. Although various attempts have been made to solve this problem by providing different sealing arrangements for the pressure chambers, these sealing arrangements have not proven entirely satisfactory. Further, the only effective means of accommodating the misalignment problem has been to mount the actuator with a flexible torque coupling to permit the actuator to shift as a unit, within limits, upon the application of either internal or external loads. This solution to the misalignment problem is not satisfactory in those applications in which a rigidly coupled high pressure actuator is necessary as for example, in the operation of a marine stabilizer or a heavy duty machine tool such as a plate brake or the like.

Other problems inherent in the prior devices include the tendency of the actuators to hunt, or shift position under conditions of varying load, and the tendency of the actuator to creep, or shift its position under conditions of constant load over extended periods of time. Further, it has not heretofore been possible to maintain an actuator at a predetermined setting under load without the constant application of fluid pressure to maintain the actuator in its preselected position. Thus, in the event of failure of hydraulic pressure, the actuators would be driven by the load, thereby creating a condition which could result in property damage or injury to personnel.

It is therefore an object of this invention to provide an improved rotary hydraulic actuator which is suitable for use in rigid coupling high pressure installations.

Another object of the invention is to provide a rotary hydraulic actuator having improved sealing means for preventing the leakage of hydraulic fluids.

The foregoing and other objects are attained in an actuator according to the present invention in which the stator is provided with a cylindrical bore extending therethrough and the rotor is provided with a cylindrical hub portion positioned coaxially within the cylindrical bore. A pair of radially extending flanges are formed one on each end of said cylindrical hub, with the diameter of the flanges being equal to the diameter of the cylindrical bore. The annular space between the cylindrical hub and the inner surface of the cylindrical bore is divided into a plurality of chambers by one or more radially extending vanes mounted on the cylindrical hub and extending between the flanges, and a like number of radial vanes mounted on and spaced around the inner circumference of the cylindrical bore and extending between the radial flanges. An improved headed fastener having a combined oil seal and locking insert formed around the outer periphery of the enlarged head portion is provided to attach the vanes to the rotor and stator respectively.

Also, each of the respective vanes has an axially extending groove formed along its inner and/or outer surface and a generally radially extending groove along each end thereof for receiving an improved seal means for preventing leakage of pressure between the chambers. This improved seal means includes an elongated soft metallic seal element which is resiliently urged toward the outer edge of the groove into sealing engagement with the adjacent rotor or stator surface. Also, a fluid pressure seal is provided between each of the radially extending flanges and a cylindrical surface on the inner periphery of the stator to prevent leakage from the pressure chamber axially and circumferentially along the cylindrical bore of the stator.

The rotor is supported for rotation, within limits defined by the position of the vanes, within the stator by a precision roller bearing on each end of the actuator, with the roller bearings having a diameter at least as great as the diameter of the cylindrical hub, and positioned closely adjacent the ends of the stator.

If desired, one of the vanes may be provided with means for automatically locking the actuator against rotation in the event of failure of fluid pressure. Preferably, the locking means also includes means for manually releasing the actuator which has been locked as a result of pressure failure.

Other objects and features of the invention will become apparent by reference to the following specification and to the drawings.

Figure 2:
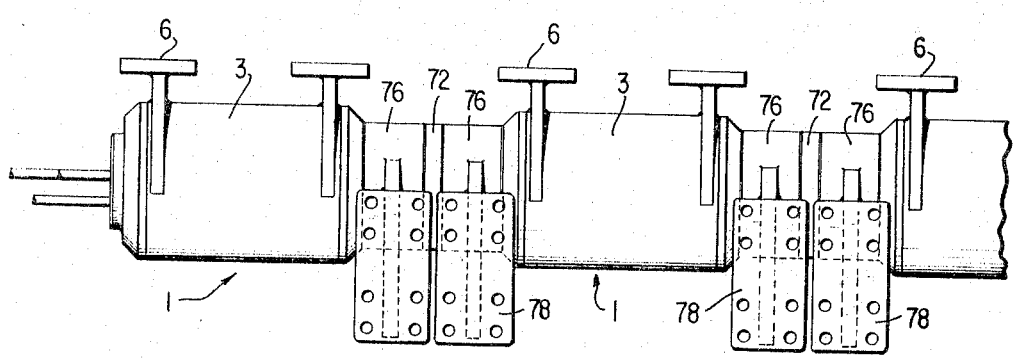

In the drawings:
FIG. 1 is a plan view, partially in section, of a marine stabilizer operated by a fluid actuator according to the present invention;
FIG. 2 is an elevation view of a number of actuators according to the present invention illustrating the manner in which a plurality of units may be utilized as necessary to perform a particular job;
FIG. 3 is a plan view of an actuator according to the present invention, with parts broken away to more clearly show other parts;
FIG. 4 is a sectional view taken on line 4—4 of FIG. 3;
FIG. 5 is a sectional view taken on line 5—5 of FIG. 3;
FIG. 6 is an enlarged fragmentary section view showing the seal between the rotor and stator;
FIG. 7 is a fragmentary view taken on line 7—7 of FIG. 6;
FIG. 8 is a fragmentary section plan view of an alternate construction of the invention;
FIG. 9 is a sectional view taken on line 9—9 of FIG. 8;
FIG. 10 is a fragmentary sectional view similar to FIG. 9, with some of the parts shown in an alternate position; and,
FIG. 11 is an enlarged fragmentary view similar to FIG. 4 showing another embodiment of the invention.

Referring now to the drawings in detail, the actuator, indicated by the numeral 1, includes a rotor assembly 2 rotatably mounted within a cylindrical bore extending axially through the housing 3 of a stator assembly 4 which is provided with a plurality of feet 6 for mounting the actuator on a suitable mounting surface. Rotor assembly 2 is formed with a pair of flanges 8 which extend radially from the ends of cylindrical hub 10 to terminate adjacent the inner cylindrical surface 12 of stator 4.

The opposed surfaces of radial flanges 8, in cooperation with cylindrical surface 10 and cylindrical bore 12 define the boundaries of an annular working chamber which, in turn, is divided into subchambers 14, 16 by a fixed vane (or vanes, as in FIGS. 8–10) 18 mounted on the cylindrical surface 12 of the stator 4 and a movable vane (or vanes) 20 mounted on the outer cylindrical surface of rotor hub 10. Vanes 18, 20 are retained on their respective cylindrical mounting surfaces by headed, screw-threaded fastener members 22 having round heads 24 adapted to be received within a countersink 25, and a peripheral groove 26 formed around the head receives and retains suitable plastic insert 28 dimensioned to fit tightly within the countersink. Insert 28 acts as a locking device to retain the fastening member against working loose, and as an oil seal to prevent leakage of the fluid pressure past the head of the fastener.

A fluid seal, such as resilient element 40 within groove 42 provides a fluid seal between cylindrical surface 2 and the outer surface of vane 18. Similarly, a fluid seal consisting of a resilient element 44 and a soft metallic bar 46 disposed within a groove 48 provides a fluid seal between the inner surface of vane 18 and the cylindrical surface of hub 10. Corresponding seals may be provided along the ends of vanes 18, 20 between the vanes and flanges 8.

Referring particularly to FIGS. 3 and 4 of the drawings, it is seen that the movable vane 20 may be provided with means for locking the stator against rotation in the event of failure of hydraulic pressure. This locking means includes a shoulder 48 formed along each longitudinal side of the vane, with a generally wedge shaped member 50 slidably positioned thereon. Members 50 have an outer surface complementary to and normally in slidable engagement with cylindrical surface 12 of stator 4. Leaf spring members 52 mounted in vane 20 and extending the full length thereof resiliently urge members 50 laterally along shoulder 48 to normally maintain member 50 in contact with surface 12. As seen in FIGS. 3 and 4, a rigid central portion 54 of vane 20 remains in contact with surface 12. Each of the wedge members 50 has a surface 56 extending substantially parallel to the radial sides of vane 20 so that, when fluid pressure is applied to one of the subchambers 14 or 16, the fluid pressure acting on surface 56 will depress leaf spring 52 to thereby relieve the wedging action between member 50 and the cylindrical surface 12 to permit rotation of the rotor within the stator. It is seen that, upon the application of fluid pressure to one of the subchambers tending to rotate the rotor in one direction, the other of the wedge members will slide freely along the cylindrical surface 12. However, upon release of the fluid pressure from within the pressurized chamber any load upon the device tending to rotate the rotor in either direction within the stator will cause one of the wedge members 50 to frictionally engage the cylindrical surface 12, thereby locking the rotor against rotation until fluid pressure is applied to side 56 of the appropriate wedge member 50 to release the wedging action.

When the self-locking type vane described above is employed the actuator cannot be permitted to rotate free, or be driven by an external load, but rather must always be actuated as a result of fluid pressure within the subchambers 14, 16. Also, when the external load is tending to rotate the rotor in the same direction as the pressure within one of the chambers, it may become necessary to apply a back pressure within another of the subchambers, to provide an opposing force to permit control of the actuator with regard to the speed of actuation, and to provide a smooth operating device.

As stated above, the loss of fluid pressure in the subchambers 14, 16 will permit a load on the actuator tending to rotate the rotor, acting with spring 52, to cause movable wedge 50 to firmly engage cylindrical bore 12, thereby locking the rotor within the stator. However, it may be desirable to release the rotor to permit rotation without use of fluid pressure, or in some instances, it may be desirable to operate the actuator without the automatic locking device. This may be accomplished by the structure illustrated in FIG. 11 wherein the spring 52 is mounted on an elongated lever 120 positioned within a channel 121 extending through movable vane 20 and into rotor 2 to intersect drilled passage 64. An elongated rod 122 is rotatably mounted in passage 64 and had a cam portion 123 engaging the end 124 of lever 120. Rod 122 extends outwardly through one end of rotor 2, with suitable seal means, not shown, being provided to assure against loss of fluid pressure. A manually operated handle 125 is rotatably fixed onto rod 122 whereby cam portion 123 may be rotated by movement of handle 125 to move the end 124 of lever 120 in a generally radial direction in rotor 2. Lever 120 is provided with a shoulder portion 126 bearing on the surface of opening 121 so that movement of end 124 will cause the pivotal movement of lever 120 about the shoulder 126 to move spring 52 to apply or release force on wedge 20 to thereby engage or disengage wedge 20 with cylindrical bore 12.

In order to prevent fluid pressure from building up within the cavity between the portion 54 of vane 20 and the sides of wedge members 50 adjacent springs 52, and thereby interfere with the relative sliding movement of member 50 with regard to shoulder 48, a bleed passage is formed in portion 54 of vane 20 and extends between cavities 62 formed between wedge members 50 and portion 54 of vane 20. Bleed 60 is in communication with drain 63 for returning fluid bled from the subchambers 14, 16 back to the hydraulic pressure system pump. If desired, a back pressure may be maintained on the drain 63 to control the rate of flow of the fluid being bled from the pressurized subchambers, thereby maintaining a predetermined pressure in cavity 62.

Fluid under pressure may be directed to the subchambers 14, 16 through drilled passages 64 extending axially through rotor 2, in communication with radially extending drilled passages 66 as shown in FIGS. 2–5, or, alternatively, the pressurized fluid may be applied through drilled passages 68 extending through the cylindrical wall of stator 4, as shown in FIGS. 8–10.

Rotor 2 is formed with an integral stub shaft 70 on each end thereof which may be coupled by suitable means such as a conventional rigid shaft coupling, to any suitable shaft to be rotated by the actuator, or alternatively, the stub shaft 70 may be coupled to a suitable shaft or the stub shaft of a second actuator by a clamping ring 72 as illustrated in FIG. 3. When a plurality of actuators are joined as illustrated in FIGS. 2 and 3 by the clamping ring 72, suitable means such as O-rings 74 may be required to permit flow of pressure fluid directly from the drilled passages 64 of one actuator to passage 64 of an adjacent actuator without leakage. A sleeve 76, having shoes 78 rigidly fixed thereon, may be fixed, as by key 79, on stub shaft 70 between clamp 72 and bearing ring 98.

In the embodiment illustrated in FIGS. 8–10 of the drawings, wherein there are two fixed vanes 18 and two movable vanes 20 dividing the annular chamber between cylindrical surfaces 10 and 12 into two pairs of working chambers 14, 16, means such as drilled passages 80 may provide fluid communication between the individual subchambers 16 of one pair of chambers so that when fluid pressure is applied to one of the subchambers 16 the fluid may flow through passages 80 and the hollow center portion 82 of rotor 2 to pressurize each of the subchambers 16 simultaneously to cause rotation of the rotor 2 in a counterclockwise direction with respect to stator 4 as viewed in FIG. 2. Similarly, means such as passage 86 may be provided for connecting the individual subchambers 14 of the other pair of subchambers so that application of fluid pressure to one of the subchambers 14 will simultaneously pressurize the other of the subchambers to cause rotation of the rotor in a clockwise direction with respect to stator 4 as viewed in FIG. 2.

As most clearly seen in FIGS. 3 and 8, the rotor 2 is mounted for rotation in stator 4 by precision needle bearings at each end of the actuator. The inner race 92 of the bearing may be formed directly on an enlarged shoulder 94 of the stub shaft of rotor 2, adjacent flanges 8, with the outer race 96 being formed on the inner periphery of a bearing ring 98 which, in turn, is mounted directly onto the end of the stator 4 as by cap screws 100 as illustrated in FIG. 3. Alternatively, the outer race of the bearing may be formed directly on the inner periphery of the stator 4 as at 102 (see FIG. 8) with the inner race 104 being formed on the outer periphery of a bearing ring which, in turn, is mounted directly onto the ends of rotor 2 as by cap screws 100. In either of the embodiments, the bearings are of a diameter at least as large as the diameter of the cylindrical hub, which, in combination with the maximum axial spacing of the bearings, provides an actuator of extremely high bearing capacity thereby permitting the actuator to be employed without the necessity of using a flexible coupling even in cases where high lateral bearing loads may be applied to the actuator as in the case of the marine stabilizer 105 illustrated in FIG. 1 of the drawings.

To prevent the flow of pressure fluid axially along the actuator between surface 12 and the outer circumference of flanges 8, to pressurize the bearings 90, a high pressure packing 110 is provided around the outer periphery of flanges 8. Since the packing may be subjected to very high pressures, a high quality pressurized packing, such as that sold by the Johns-Manville Co., under the trade name of Uneepac, may be required to provide a satisfactory seal along the axis of the actuator. However, this type of packing may permit excessive leakage past the ends of the vanes 18, 20 to flow from one of the subchambers 14, 16 to the other, depending upon the pressure differential between adjacent subchambers. This leakage around the ends of the vanes is prevented by providing a plurality of dam portions 112 spaced along the innermost layer of packing, as illustrated in FIGS. 6 and 7, with the circumferential spacing of the dam portions 112 being less than the width of a vane, so that each of the vanes will always overlie at least one of the dams, thereby preventing the flow of pressure fluid around the ends of the vanes within the pressure grooves of the packing material. Note in FIG. 6 that the packing 110 has a cross section substantially in the shape of an isosceles trapezoid with a pair of grooves 111 cut into the longer parallel side of the trapezoid. Also a third groove 113 may be formed in the shorter parallel side to facilitate assembly. The packing 110 is axially compressed by a lip 114 on the bearing ring 98.

From the above it can be seen that I have provided a hydraulic rotor actuator which may be manufactured relatively inexpensively, and which requires little or no maintenance. The high bearing capacity of the actuator enables its use as a primary pivot, thereby eliminating the necessity of using the conventional flexible shaft coupling in conjunction with the actuator. The actuator is extremely flexible of application, lending itself readily to be employed as a hinge, coupled onto a shaft, or joined to other actuators for increased capacity. The high bearing capacity and the ability of the actuator to be readily coupled with other units makes it ideal for use as a hinge joint, illustrated in FIG. 2, as for example, for use in opening and closing heavy marine hatch covers which are folded along a line (or lines) intermediate their width for opening and closing.

While I have disclosed a preferred embodiment of my invention I wish it understood that I do not intend to be restricted solely thereto, but that I do intend to cover all embodiments which would be obvious to one skilled in the art and which come within the spirit and scope of my invention.

I claim:

A rotary fluid actuator comprising, a housing having a cylindrical bore extending therethrough, a rotor rotatably mounted coaxially within said cylindrical bore, a pair of radially extending flanges on said rotor defining an annular pressure chamber between said rotor and said cylindrical bore, a fixed vane mounted on the surface of said cylindrical bore, a movable vane mounted on said rotor, said fixed and movable vanes dividing said annular pressure chamber into a pair of subchambers, fluid passage means for directing fluid under pressure to each of said subchambers, and seal means between said flanges and said housing for preventing the flow of fluid therebetween, said seal means including an elongated packing element having a cross section in the general shape of an isosceles trapezoid with a pair of parallel grooves formed in the longer parallel side and spaced equal distance from the non parallel ends thereof, said parallel grooves terminating at spaced intervals along the length of said element by dam portions preventing the flow of fluid along said parallel grooves, said spaced intervals being less than the circumference width of said vanes.

References Cited by the Examiner

UNITED STATES PATENTS

| | | | |
|---|---|---|---|
| 1,942,705 | 1/1934 | Hubbard et al. | 277—205 X |
| 2,665,151 | 1/1954 | Fisler et al. | 277—123 X |
| 2,684,262 | 7/1954 | Neesen | 277—124 |
| 2,954,012 | 9/1960 | Curtis et al. | 92—125 X |
| 2,966,144 | 12/1960 | Self. | |
| 3,053,232 | 9/1962 | Self | 92—122 X |
| 3,083,975 | 4/1963 | Kelly | 103—126 |
| 3,128,679 | 4/1964 | Trendle | 92—125 X |
| 3,232,185 | 2/1966 | Kummerman | 92—122 X |

FOREIGN PATENTS 936,309   9/1963   Great Britain.

MARTIN P. SCHWADRON, *Primary Examiner.*

I. C. COHEN, *Assistant Examiner.*